United States Patent
Nose

(10) Patent No.: US 11,418,705 B2
(45) Date of Patent: Aug. 16, 2022

(54) DETECTION SYSTEM

(71) Applicant: SONY SEMICONDUCTOR SOLUTIONS CORPORATION, Kanagawa (JP)

(72) Inventor: Atsushi Nose, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 386 days.

(21) Appl. No.: 16/336,764

(22) PCT Filed: Oct. 19, 2017

(86) PCT No.: PCT/JP2017/037868
§ 371 (c)(1),
(2) Date: Mar. 26, 2019

(87) PCT Pub. No.: WO2018/105247
PCT Pub. Date: Jun. 14, 2018

(65) Prior Publication Data
US 2021/0306554 A1    Sep. 30, 2021

(30) Foreign Application Priority Data
Dec. 7, 2016 (JP) .............................. JP2016-237177

(51) Int. Cl.
*H04N 5/232* (2006.01)
*H04N 5/247* (2006.01)
(Continued)

(52) U.S. Cl.
CPC ......... *H04N 5/23218* (2018.08); *G06V 20/42* (2022.01); *G06V 20/58* (2022.01);
(Continued)

(58) Field of Classification Search
CPC ............... H04N 5/23218; H04N 5/247; H04N 5/23206; G06K 9/00805; G06K 2009/00738; G06K 9/00724
See application file for complete search history.

(56) References Cited

U.S. PATENT DOCUMENTS

| | | | | |
|---|---|---|---|---|
| 8,869,449 | B2 * | 10/2014 | El Fassi ................ | E05F 15/40 49/26 |
| 10,315,672 | B2 * | 6/2019 | Beyer .................... | B61K 9/00 |

(Continued)

FOREIGN PATENT DOCUMENTS

| | | |
|---|---|---|
| CN | 1913624 A | 2/2007 |
| DE | 10101571 A1 | 8/2001 |

(Continued)

OTHER PUBLICATIONS

International Search Report and Written Opinion of PCT Application No. PCT/JP2017/037868, dated Jan. 9, 2018, 11 pages of ISRWO.

*Primary Examiner* — Boubacar Abdou Tchoussou
(74) *Attorney, Agent, or Firm* — Chip Law Group

(57) ABSTRACT

A detection system detects an occurred event at a plurality of positions with high accuracy. The detection system includes a plurality of cameras, each of which performs detection processing to output detection information, a network that transmits pieces of detection information from the plurality of cameras and a system control unit that provides notification of occurrence of a predetermined event on the basis of the pieces of detection information from the plurality of cameras. Each of the plurality of cameras includes an image capturing element that captures an image of a target object, and generates image-data frames that time-sequentially line up and a detection frame determination unit that determines relationship between the target object and a (Continued)

predetermined detection frame, and generates a result of the determination as the detection information.

6 Claims, 12 Drawing Sheets

(51) Int. Cl.
 *G06V 20/40* (2022.01)
 *G06V 20/58* (2022.01)
(52) U.S. Cl.
 CPC ......... *H04N 5/23206* (2013.01); *H04N 5/247* (2013.01); *G06V 20/44* (2022.01)

(56) References Cited

U.S. PATENT DOCUMENTS

| | | | |
|---|---|---|---|
| 10,618,529 B2 * | 4/2020 | Maruta | ............... H04N 7/18 |
| 2001/0030690 A1 | 10/2001 | Ishikawa et al. | |
| 2007/0036515 A1 | 2/2007 | Oosawa | |
| 2009/0074246 A1 | 3/2009 | Distante et al. | |
| 2010/0020175 A1 * | 1/2010 | Takada | ............... B61L 15/0081 |
| | | | 348/148 |
| 2013/0120582 A1 * | 5/2013 | Daniels | ............... G06T 5/006 |
| | | | 348/157 |
| 2013/0125468 A1 * | 5/2013 | El Fassi | ............... E05F 15/43 |
| | | | 49/26 |
| 2014/0049647 A1 * | 2/2014 | Ick | ............... G06K 9/6267 |
| | | | 348/148 |
| 2014/0104434 A1 | 4/2014 | Oosawa | |
| 2016/0150197 A1 | 5/2016 | Oosawa | |
| 2017/0013237 A1 * | 1/2017 | Ito | ............... H04N 5/232933 |
| 2017/0050652 A1 * | 2/2017 | Beyer | ............... B61L 15/0081 |
| 2018/0354535 A1 * | 12/2018 | Cho | ............... B61L 27/04 |
| 2019/0248383 A1 * | 8/2019 | Maruta | ............... H04N 21/214 |

FOREIGN PATENT DOCUMENTS

| | | |
|---|---|---|
| EP | 1752945 A2 | 2/2007 |
| JP | 2001-195564 A | 7/2001 |
| JP | 2004-128646 A | 4/2004 |
| JP | 2005-349997 A | 12/2005 |
| JP | 2006-293419 A | 10/2006 |
| JP | 2007-049521 A | 2/2007 |
| JP | 2009-528119 A | 8/2009 |
| JP | 2012-011987 A | 1/2012 |
| JP | 2013-100008 A | 5/2013 |
| JP | 5442261 B2 | 3/2014 |
| WO | 2007/099502 A2 | 9/2007 |

* cited by examiner

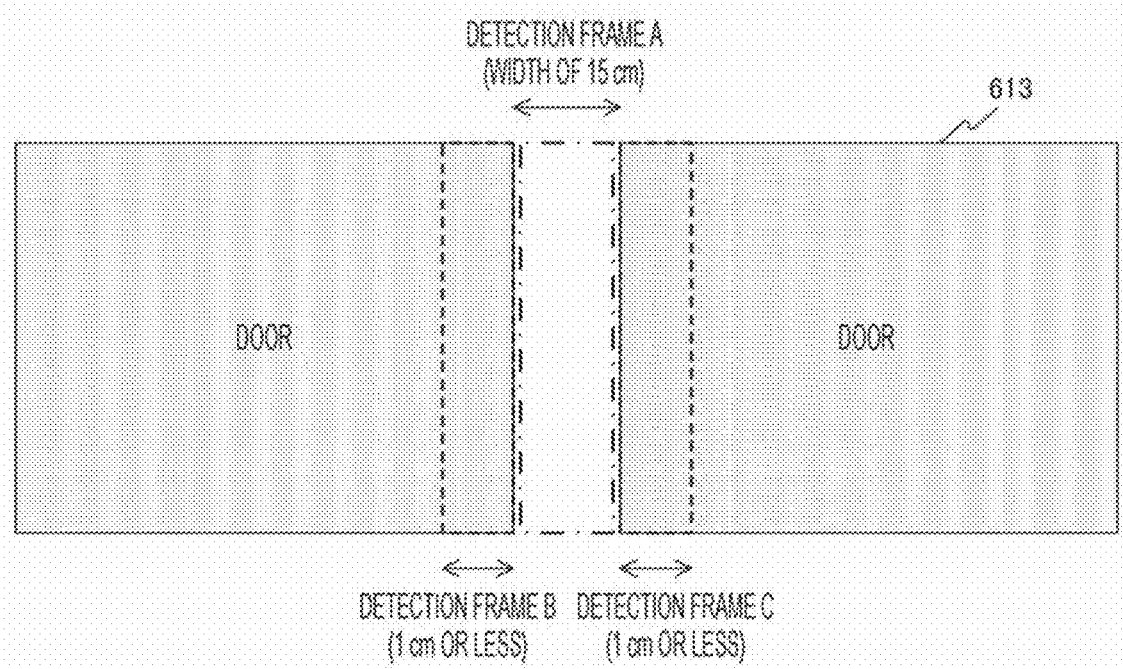

DETECTION SYSTEM

CROSS REFERENCE TO RELATED APPLICATIONS

This application is a U.S. National Phase of International Patent Application No. PCT/JP2017/037868 filed on Oct. 19, 2017, which claims priority benefit of Japanese Patent Application No. JP 2016-237177 filed in the Japan Patent Office on Dec. 7, 2016. Each of the above-referenced applications is hereby incorporated herein by reference in its entirety.

TECHNICAL FIELD

The present technology relates to a detection system. Specifically, the present technology relates to a detection system that detects an event by using a plurality of image sensors.

BACKGROUND ART

Conventionally, in a detection system for risk aversion, for example, in order to detect an air back of a car or a door of an electric train, a physical sensor for detecting a collision, being caught between, or the like, is used. Therefore, there may occur, for example, a case where it is not possible to respond to a collision depending on the speed of collision detection or the distance, or a case where sudden expansion causes an injury at the time of a response at high speed. Accordingly, there is proposed, for example, a system that detects opening and closing of a vehicle door by using a range image sensor in an electric train (refer to, for example, Patent Document 1).

CITATION LIST

Patent Document

Patent Document 1: Japanese Patent Application Laid-Open No. 2013-100008

SUMMARY OF THE INVENTION

Problems to be Solved by the Invention

In the prior art described above, opening and closing of the vehicle door is detected without using a physical sensor. However, in this prior art, detection is performed by obtaining a three-dimensional range image using a range image sensor, and therefore it is difficult to enhance the response speed. In general, approximately a processing speed of 30 to 120 fps (frames/sec) is sufficient for displaying an image. However, high speed is important for risk avoidance, and thus the above-described processing speed is not sufficient. In addition, a plurality of doors operate substantially at the same time in a vehicle of the electric train, and therefore it is necessary to detect the operations at the same time.

The present technology has been devised in consideration of such a situation, and an object of the present technology is to detect an occurred event at a plurality of positions with high accuracy.

Solutions to Problems

The present technology has been achieved to solve the above-described problems, and a first aspect thereof is a detection system including: a plurality of cameras, each of which performs detection processing to output detection information; a network that transmits pieces of detection information from the plurality of cameras; and a system control unit that determines occurrence of a predetermined event on the basis of the pieces of detection information from the plurality of cameras, in which each of the plurality of cameras includes: an image capturing element that captures an image of a target object, and generates image-data frames that time-sequentially line up; a binarization processing unit that subjects each of the frames to binarization processing to generate binarized frames; a moment generation unit that calculates a moment of the target object included in the binarized frames; a target object detection unit that detects the target object included in the binarized frames on the basis of the moment generated by the moment generation unit; and a detection frame determination unit that determines relationship between the target object and a predetermined detection frame, and generates a result of the determination as the detection information. This produces an effect of determining occurrence of a predetermined event on the basis of the detection information from the plurality of cameras.

In addition, in this first aspect, the detection system may be configured in such a manner that the system control unit determines occurrence of the predetermined event on the basis of detection information detected earliest among the pieces of detection information from the plurality of cameras. This produces an effect of determining occurrence of a predetermined event on the basis of the detection information detected earliest.

In addition, in this first aspect, the detection system may be configured in such a manner that the plurality of cameras are provided corresponding to a plurality of vehicle doors respectively, and the detection system further includes a door control determination unit that gives an instruction of control for the corresponding vehicle door according to the detection information generated by the detection frame determination unit. This produces an effect of giving an instruction of control for the corresponding vehicle door according to the detection information.

In addition, in this first aspect, the detection system may be configured in such a manner that each of the plurality of cameras is provided around a goal of a ball game, the target object detection unit detects a spherical body as the target object, and the detection frame determination unit determines whether or not the whole spherical body has entered the goal. This produces an effect of determining, according to the detection information, whether or not the whole spherical body has entered the goal.

Effects of the Invention

According to the present technology, an excellent effect of enabling an occurred event at a plurality of positions to be detected with high accuracy can be exhibited. It should be noted that the effects described herein are not necessarily limited, and may be any one of the effects described in the present disclosure.

BRIEF DESCRIPTION OF DRAWINGS

FIG. 6 is a view illustrating an example of a detection frame of the vehicle door 613 according to the first embodiment of the present technology.

MODE FOR CARRYING OUT THE INVENTION

Modes for carrying out the present technology (hereinafter referred to as embodiment) will be described below. The description will be made in the following order.
1. First embodiment (an example of a vehicle door detection system)
2. Second embodiment (an example of a soccer goal detection system)

1. First Embodiment

Configuration of Vehicle Door Detection System

Figure 1:
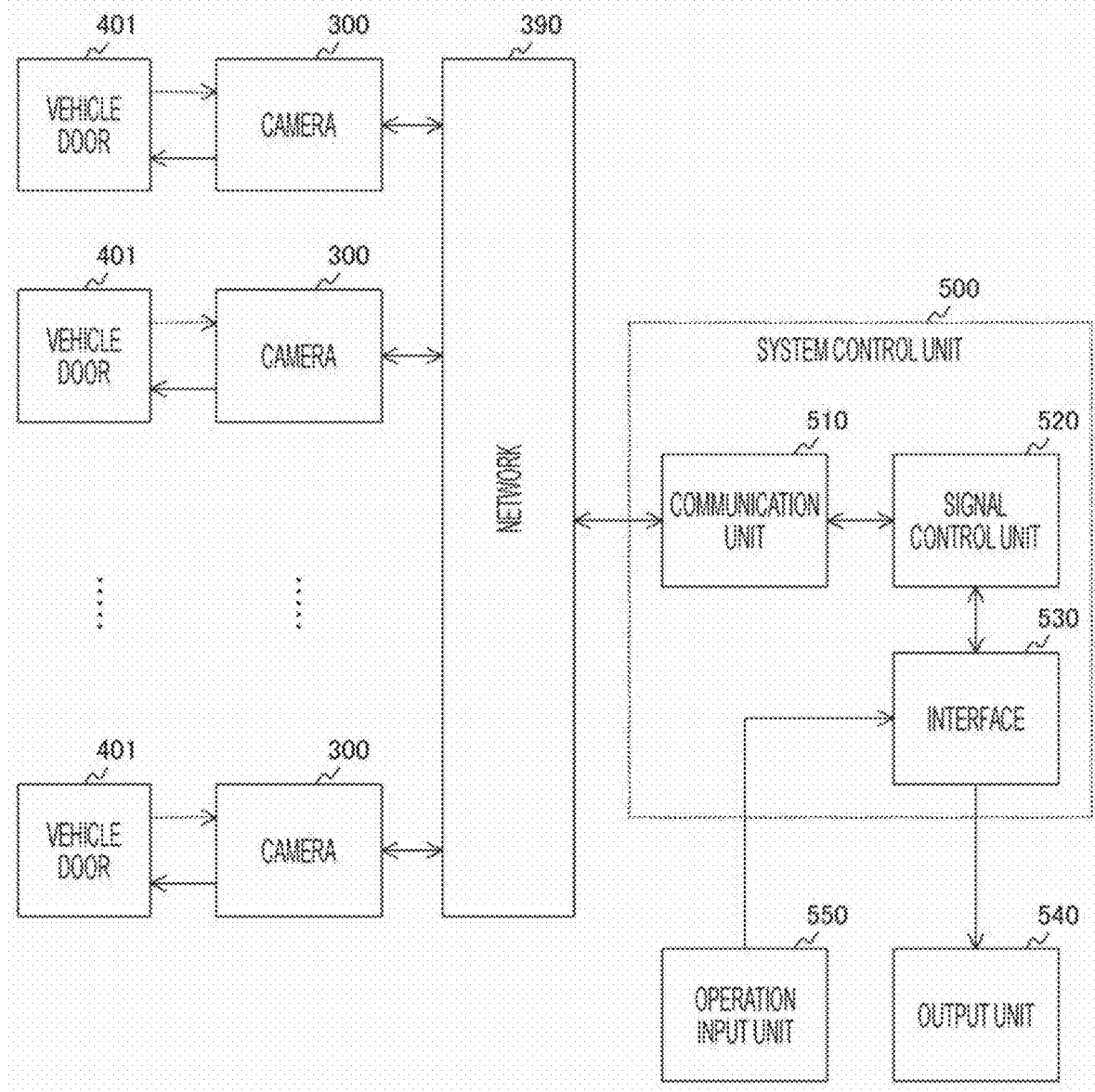
FIG. 1 is a diagram illustrating an example of an overall configuration of a vehicle door detection system according to a first embodiment of the present technology.

FIG. 1 is a diagram illustrating an example of an overall configuration of a vehicle door detection system according to the first embodiment of the present technology. This vehicle door detection system is provided with a plurality of cameras 300, a network 390, a system control unit 500, an output unit 540, and an operation input unit 550.

The plurality of cameras 300 are provided respectively corresponding to a plurality of vehicle doors 401 in a vehicle that is a detection target. The plurality of cameras 300 each capture an image of a target object, each perform detection processing, and each output detection information. The target object is not limited to a creature such as a person and an animal. The target object is an object that widely includes nonliving materials. In this first embodiment, the cameras 300 detect a foreign object at the time of closing operation of the respective vehicle doors 401.

The network 390 transmits the detection information from the plurality of cameras 300 to the system control unit 500.

The system control unit 500 determines occurrence of a predetermined event on the basis of the detection information from the plurality of cameras 300. In this first embodiment, the system control unit 500 determines whether or not insertion of a foreign object has occurred at the time of closing operation in any of the vehicle doors 401.

The operation input unit 550 accepts operation input from the outside. In this first embodiment, this operation input unit 550 is used by a conductor of the vehicle to perform operation input for giving an instruction of opening and closing of the vehicle doors 401.

The output unit 540 outputs a notification from the system control unit 500. In this first embodiment, when a foreign object has been detected, this output unit 540 is used to notify the conductor of the vehicle of a number of the corresponding vehicle door 401 and an image. On the basis of this notification, the conductor performs, on his/her own judgment, operation input for giving an instruction of closing operation of the vehicle door 401 through the operation input unit 550.

The system control unit 500 is provided with a communication unit 510, a signal control unit 520, and an interface 530. The communication unit 510 is a communication interface that communicates with the network 390 to receive the detection information from the plurality of cameras 300. The signal control unit 520 controls each signal of the detection information received from the plurality of cameras 300. The interface 530 is an interface with the outside, and is connected to the output unit 540 and the operation input unit 550.

Figure 2:
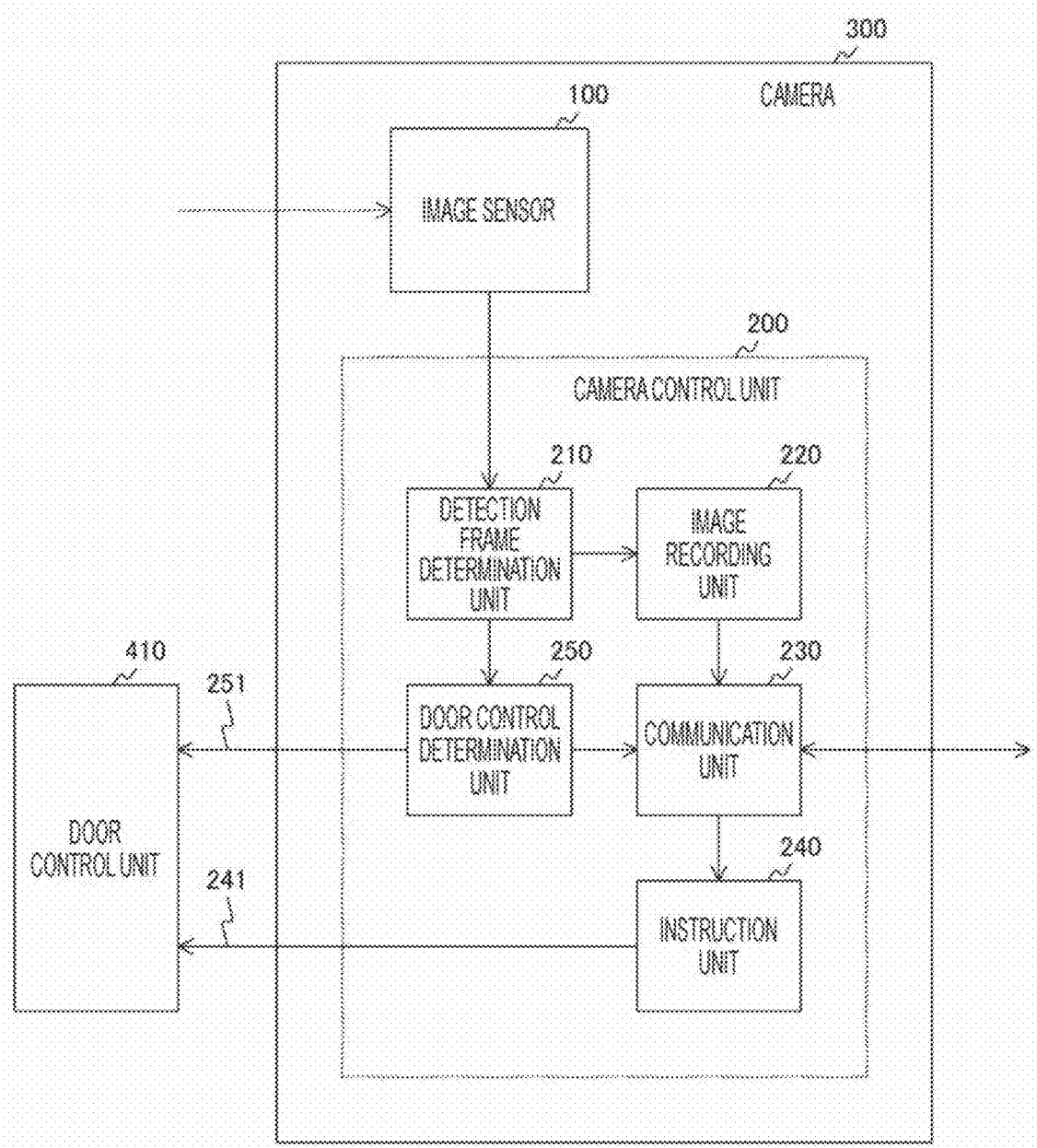
FIG. 2 is a diagram illustrating a configuration example of a camera 300 according to the first embodiment of the present technology.

FIG. 2 is a diagram illustrating a configuration example of the camera 300 according to the first embodiment of the present technology. The camera 300 is provided with the image sensor 100 and a camera control unit 200. The image sensor 100 captures an image of an object including a target object. The camera control unit 200 performs detection according to output from the image sensor 100, outputs detection information, and controls a door control unit 410. The door control unit 410 controls opening and closing of the vehicle doors 401 in the vehicle that is a detection target.

The camera control unit 200 of the camera 300 is provided with a detection frame determination unit 210, an image recording unit 220, a communication unit 230, an instruction unit 240, and a door control determination unit 250.

The detection frame determination unit 210 determines a relationship between a target object and a predetermined detection frame in a frame image output from the image sensor 100, and generates a result of the determination as detection information. As described later, this detection frame determination unit 210 determines existence of a foreign object by using the predetermined detection frame as a criterion.

The image recording unit 220 records the frame image output from the image sensor 100 according to the detection information generated by the detection frame determination unit 210. This image recording unit 220 is provided with a recording medium such as a flash memory, and records a frame image in the recording medium.

The communication unit 230 is a communication interface that communicates with the network 390 to transmit detection information to the system control unit 500.

The instruction unit 240 supplies, through a signal line 241, the door control unit 410 with a control signal for giving an instruction of opening and closing of the vehicle door 401.

The door control determination unit 250 supplies an interrupt signal related to opening and closing of the vehicle door 401 through a signal line 251. In other words, the instruction unit 240 supplies a control signal related to ordinary opening and closing operation, and the door control determination unit 250 supplies an interrupt signal related to exception processing at the time of abnormality detection.

Figure 3:
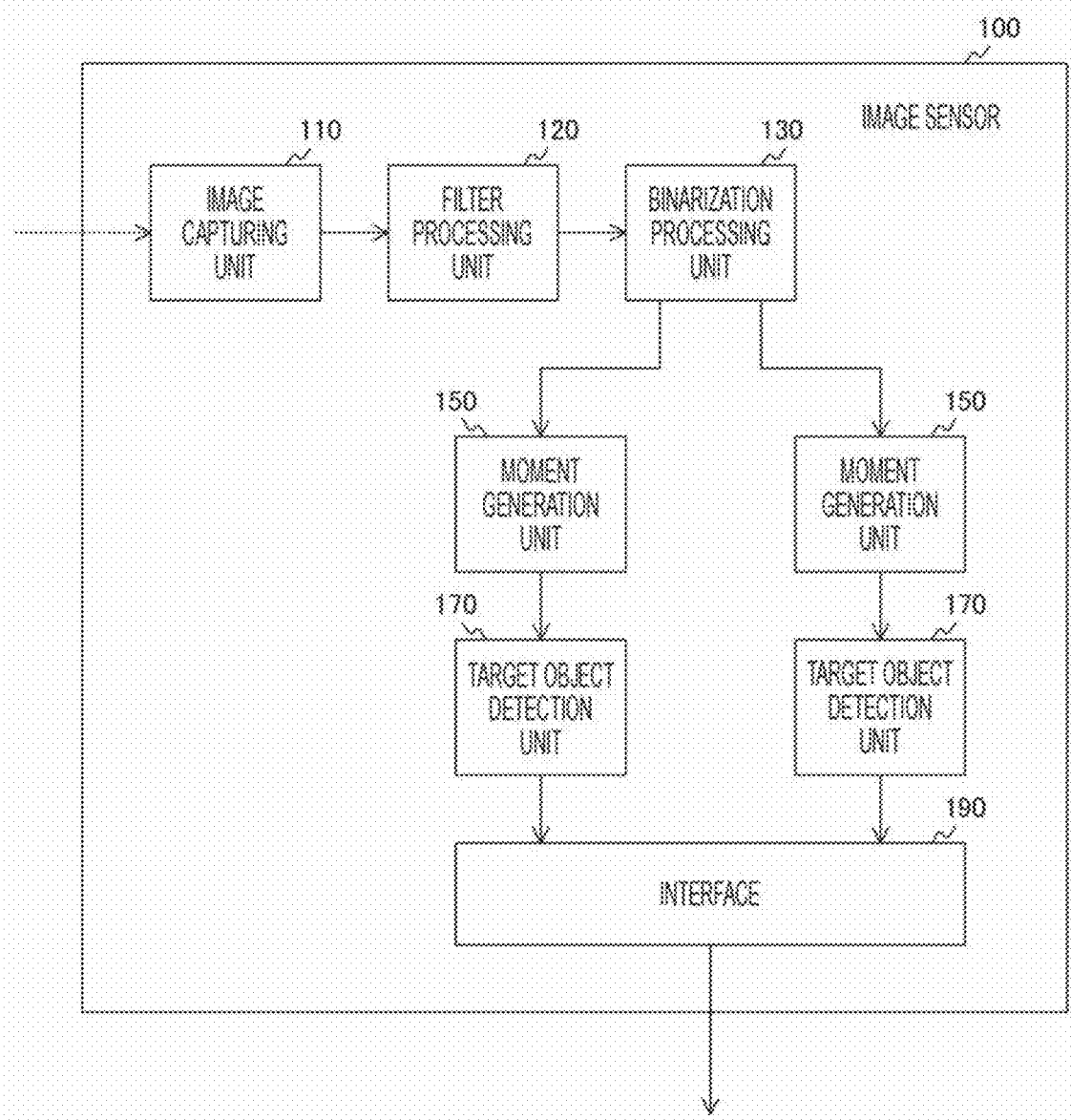
FIG. 3 is a diagram illustrating a configuration example of an image sensor 100 according to an embodiment of the present technology.

FIG. 3 is a diagram illustrating a configuration example of the image sensor 100 according to an embodiment of the present technology. The image sensor 100 is provided with an image capturing unit 110, a filter processing unit 120, a binarization processing unit 130, a moment generation unit 150, a target object detection unit 170, and an interface 190.

The image capturing unit 110 is an image-capturing element that captures an image of an object including a target object. This image capturing unit 110 generates image-data frames that time-sequentially line up at a predetermined frame rate. Here, a high frame rate of 1000 frames per second (1000 fps) or more is assumed as the frame rate. It is not always necessary to supply all image-data frames captured by this image capturing unit 110 to the outside of the image sensor 100. Image data having a high frame rate is targeted for detection described below, and therefore a frame rate that is lower than this frame rate suffices for display purposes. In other words, limiting the use of image data having a high frame rate to reference in the image sensor 100 enables a bandwidth of the image sensor 100 to be effectively utilized. It should be noted that the image capturing unit 110 is an example of the image capturing element set forth in claims.

The filter processing unit 120 subjects each of image-data frames captured by the image capturing unit 110 to filter processing. As the filter processing by this filter processing unit 120, for example, noise removal processing by a moving average filter, a median filter, or the like, outline detection processing by a Sobel filter or the like, edge detection by a Laplacian filter or the like are assumed, and the like. In addition, by determining the Euler number of an image by this filter processing unit 120, the number of target objects included in the image can also be calculated. The Euler number is a number obtained by subtracting the number of pores from the number of components. In addition, other feature quantities of image data can be extracted by this filter processing unit 120.

The binarization processing unit 130 performs binarization processing for each of the frames, each having been subjected to the filter processing by the filter processing unit 120. This binarization processing unit 130 binarizes the image data on the basis of histogram information related to brightness and color, the histogram information being included in image data of each frame, and generates a binarized frame that includes the binarized data.

The moment generation unit 150 calculates a moment of a two-variable function in the binarized frame generated by the binarization processing unit 130. A zero-order moment represents a variation of the area of a target object included in the binarized frame, and is a value that is invariant against the rotation and scaling of an image. It should be noted that as shown in this example, the plurality of moment generation units 150 may be provided in such a manner that the different moment generation units 150 are assigned to a plurality of detection frames.

The target object detection unit 170 detects a target object included in the binarized frame on the basis of the moment generated by the moment generation unit 150. It should be noted that as shown in this example, in a case where the plurality of moment generation units 150 are provided, the plurality of target object detection units 170 may be provided corresponding to the plurality of moment generation units 150.

The interface 190 is an interface with the camera control unit 200 in the camera 300. In a case where the plurality of target object detection units 170 are provided, detection results from the plurality of target object detection units 170 are collectively supplied to the camera control unit 200.

Figure 4A:
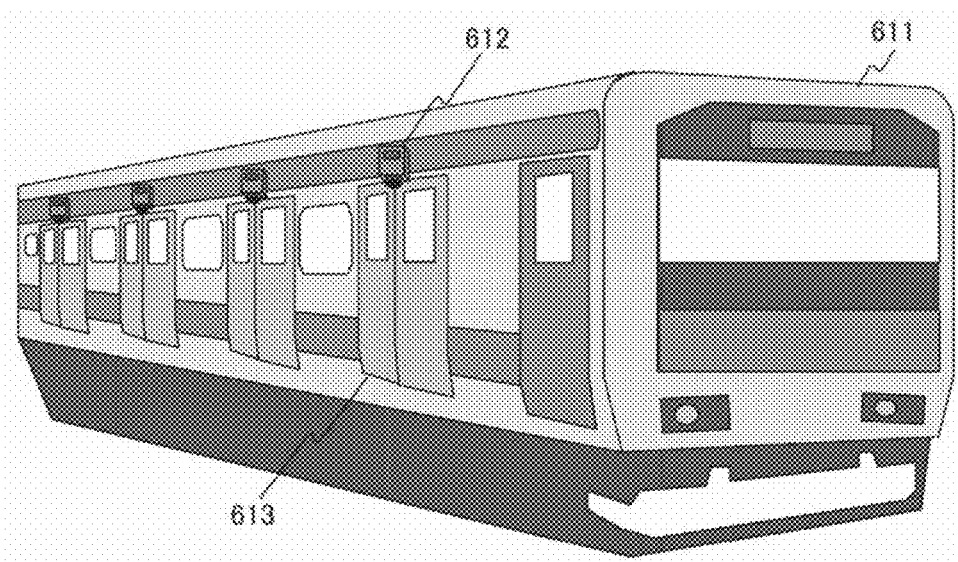
FIGS. 4A and 4B are views illustrating an installation example of the camera 300 according to the first embodiment of the present technology.
Figure 4B:
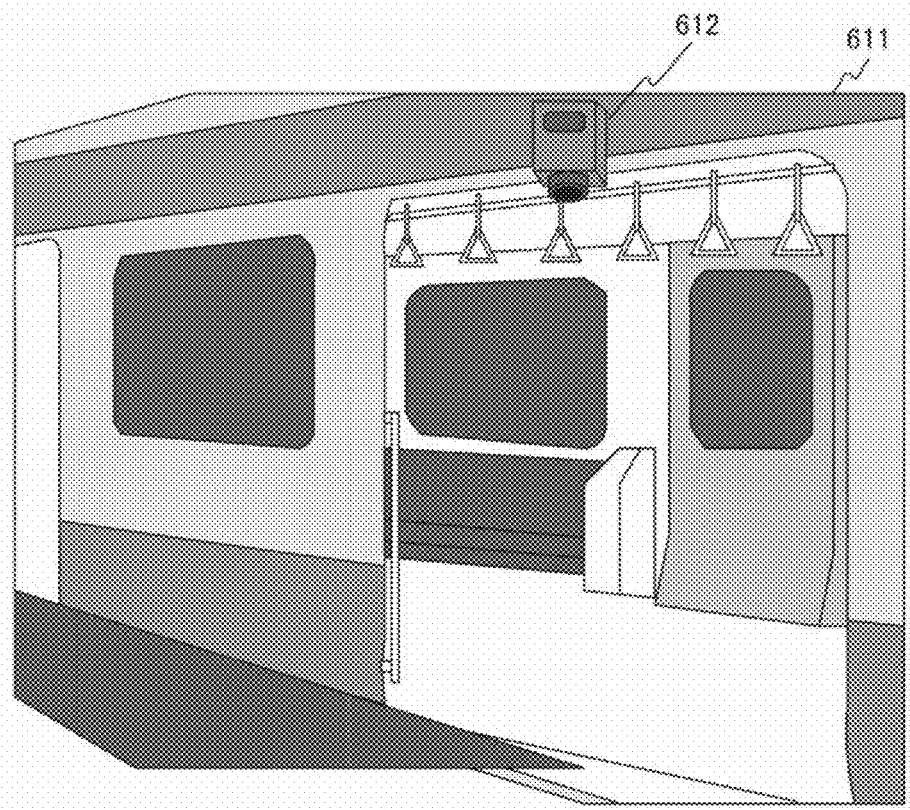

FIGS. 4A and 4B are views illustrating an installation example of the camera 300 according to the first embodiment of the present technology. In this embodiment, in the vehicle 611, the cameras 612 are installed corresponding to the plurality of vehicle doors 613 respectively. This camera 612 corresponds to the above-described camera 300, and is installed in an upper part of the vehicle door 613. The vehicle door 613 corresponds to the above-described vehicle door 401.

This camera 612 captures an image of a central part of opening and closing of the vehicle door 613, and is adapted to be capable of observing a state in which when the vehicle door 613 is closed, a foreign object is inserted therein. The detection frame described later is used to detect a foreign object.

Figure 5A:
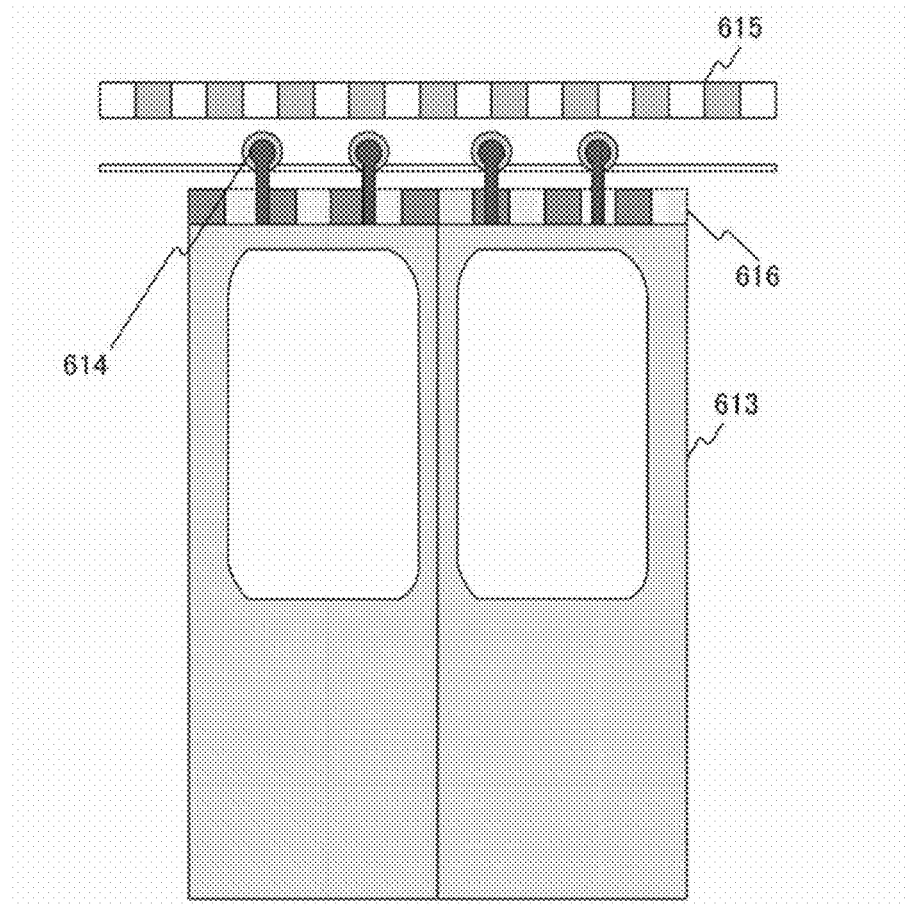
FIGS. 5A and 5B are views illustrating an example of an opening and closing control mechanism of a vehicle door 613 according to the first embodiment of the present technology.
Figure 5B:
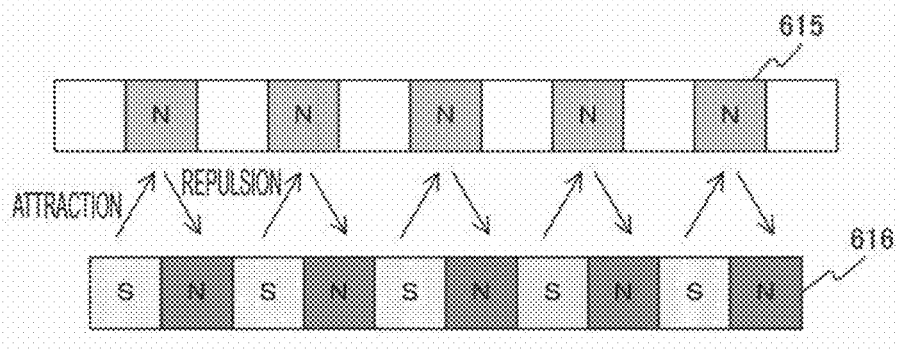

FIGS. 5A and 5B are diagrams illustrating an example of an opening and closing control mechanism of the vehicle door 613 according to the first embodiment of the present technology.

As shown in a of the same figure, a permanent magnet 616 is provided in an upper part of the vehicle door 613 so as to open and close the vehicle door 613. In addition, a coil 615 is provided on the vehicle 611 side corresponding to the vehicle door 613. This coil 615 functions as an electromagnet by being fed with a current. Moreover, the vehicle door 613 is installed so as to be movable in the horizontal direction by rollers 614 put on a rail.

As shown in b of the same figure, feeding a current to the coil 615 causes the coil 615 to function as an electromagnet, and consequently the attracting force and the repulsive force act between the coil 615 and the permanent magnet 616 of the vehicle door 613. As the result, opening and closing of the vehicle door 613 can be controlled by a direction of the current fed to the coil 615. A control signal for controlling opening and closing of this vehicle door 613 is generated by the door control unit 410.

FIG. 6 is a view illustrating an example of a detection frame of the vehicle door 613 according to the first embodiment of the present technology.

In this example, a detection frame A having a width of 1.5 cm is provided in the central part of opening and closing of the vehicle door 613, and detection frames B and C each having a width of 1 cm or less are provided on both sides thereof respectively. Here, the reason why the detection frame A has a width of 1.5 cm is because accuracy that is difficult to sense by a general physical sensor is achieved. When closing operation of the vehicle door 613 is given in instruction through the operation input unit 550, the instruction unit 240 outputs, through the signal line 241, a control signal for giving an instruction of closing operation of the vehicle door 613 to the door control unit 410. This causes the vehicle door 613 to change from an open state to a close state. In that case, when an end part of the vehicle door 613 reaches the detection frame B or C, the detection frame determination unit 210 detects this, and causes the image recording unit 220 to start recording of a frame image. In addition, when the end part of the vehicle door 613 reaches the detection frame A beyond the detection frame B or C, the detection frame determination unit 210 detects this, and starts determination as to whether or not a foreign object has been detected.

After the start of the determination as to whether or not a foreign object has been detected, when some kind of object is detected in the detection frame A, the detection frame determination unit 210 notifies the door control determination unit 250 of the detection. Consequently, the door control determination unit 250 outputs, through the signal line 251, an interrupt signal for instructing the door control unit 410 to stop the closing operation of the vehicle door 613. Subsequently, as the result of determination by the conductor, when an operation input for giving an instruction of closing operation of the vehicle door 401 is made through the operation input unit 550, the instruction unit 240 outputs, through the signal line 241, a control signal for instructing the door control unit 410 to perform closing operation of the vehicle door 613. This causes the vehicle door 613 to change to the close state.

Operation of Vehicle Door Detection System

Figure 7:
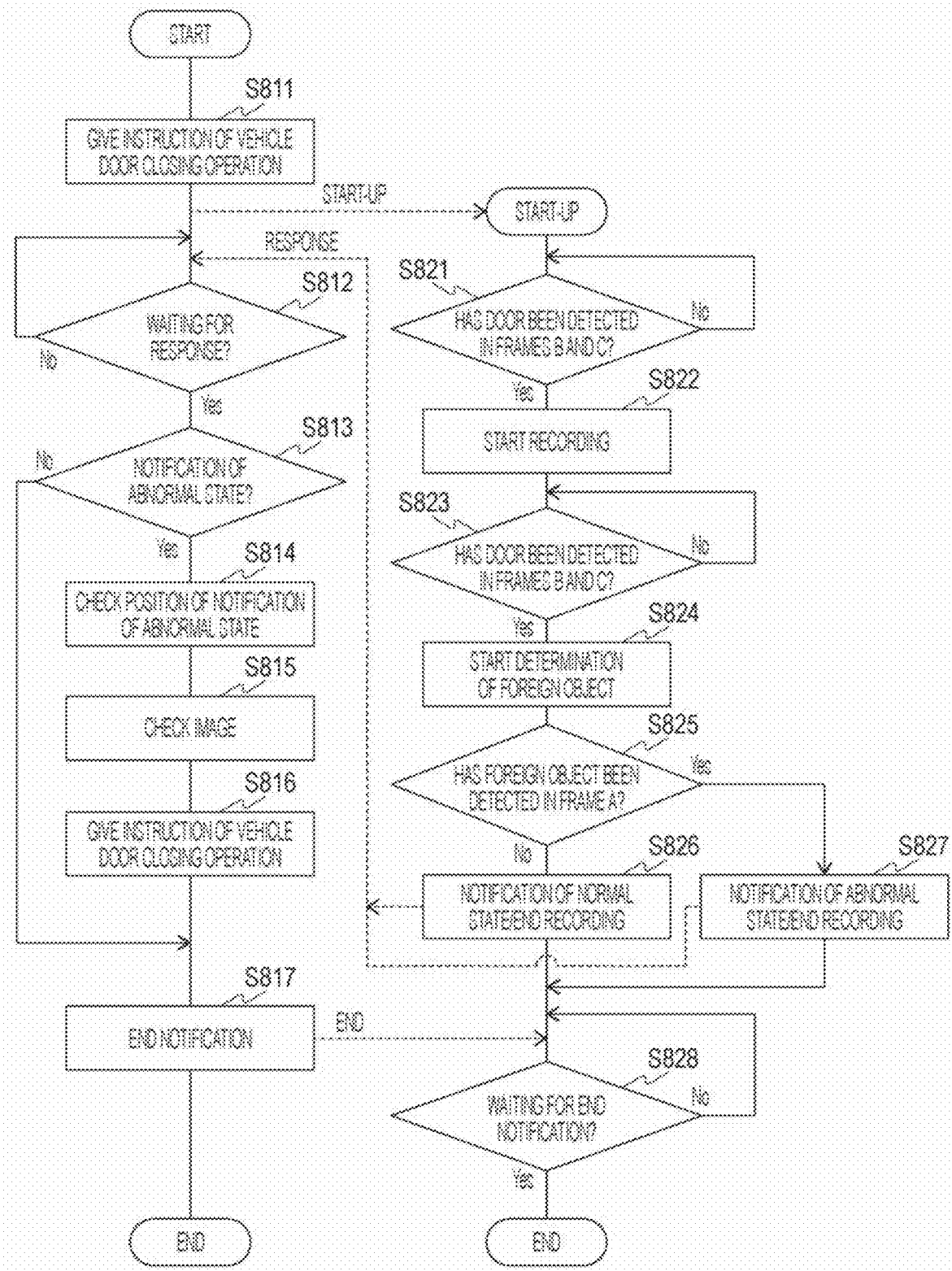
FIG. 7 is a flowchart illustrating an example of a processing procedure of the vehicle door detection system according to the first embodiment of the present technology.

FIG. 7 is a flowchart illustrating an example of a processing procedure of the vehicle door detection system according to the first embodiment of the present technology. The left side indicates a processing procedure of the system control unit 500, and the right side indicates a processing procedure of the camera 300.

When closing operation of the vehicle door 401 is given in instruction in the operation input unit 550 (step S811), operation is started in the plurality of cameras 300. In other words, in each of the plurality of cameras 300, the instruction unit 240 instructs the door control unit 410 to perform closing operation of the vehicle door 401, and determination is started in the detection frame determination unit 210. Subsequently, the system control unit 500 enters a response waiting state of waiting for a response from the camera 300 (step S812).

The detection frame determination unit 210 repeats the determination until the end part of the vehicle door 613 reaches the detection frames B and C in the frame image (step S821: No). When the end part of the vehicle door 613 reaches the detection frame B or C (step S821: Yes), the image recording unit 220 starts recording of the frame image (step S822). In addition, when the end part of the vehicle door 613 reaches the detection frame A beyond the detection frame B or C (step S823: Yes), the detection frame determination unit 210 starts determination as to whether or not a foreign object has been detected (step S824).

If a foreign object is not detected (step S825: No), the detection frame determination unit 210 stops recording in the image recording unit 220, and notifies the system control unit 500 of being in a normal state (step S826). Meanwhile, if the detection frame determination unit 210 detects a foreign object (step S825: Yes), the detection frame determination unit 210 stops recording in the image recording unit 220, and notifies the system control unit 500 of being in an abnormal state (step S827). This notification of the abnormal state includes a number of the vehicle door 401 and an image. Subsequently, the camera 300 enters a waiting state of waiting for an end notification from the system control unit 500 (step S828).

When a notification of a normal state or an abnormal state is received from the camera 300 of the vehicle door 401 as a response (step S812: Yes), the system control unit 500 determines whether or not the response is a notification of an abnormal state (step S813). If the response is not a notification of an abnormal state (step S813: No), the system control unit 500 notifies the camera 300 of an end (step S817).

Meanwhile, if the response is a notification of an abnormal state (step S813: Yes), the conductor checks the number of the vehicle door 401 (step S814), and checks an image thereof (step S815). As the result, if there is no problem, the conductor uses the operation input unit 550 to manually give an instruction of closing operation of the vehicle door 401 (step S816). Subsequently, the system control unit 500 notifies the camera 300 of an end (step S817).

Incidentally, in a case where notifications have been received from the plurality of cameras 300, it is assumed that the system control unit 500 performs processing in step S813 and later for the earliest detection.

When an end notification is received from the system control unit 500 (step S828: Yes), the camera 300 ends the process.

In this manner, according to the first embodiment of the present technology, a foreign object can be detected with high accuracy by determining a detection frame at a high frame rate of 1000 fps or more in the cameras 300 provided corresponding to the plurality of vehicle doors 401 respectively.

2. Second Embodiment

Configuration of Soccer Goal Detection System

Figure 8:
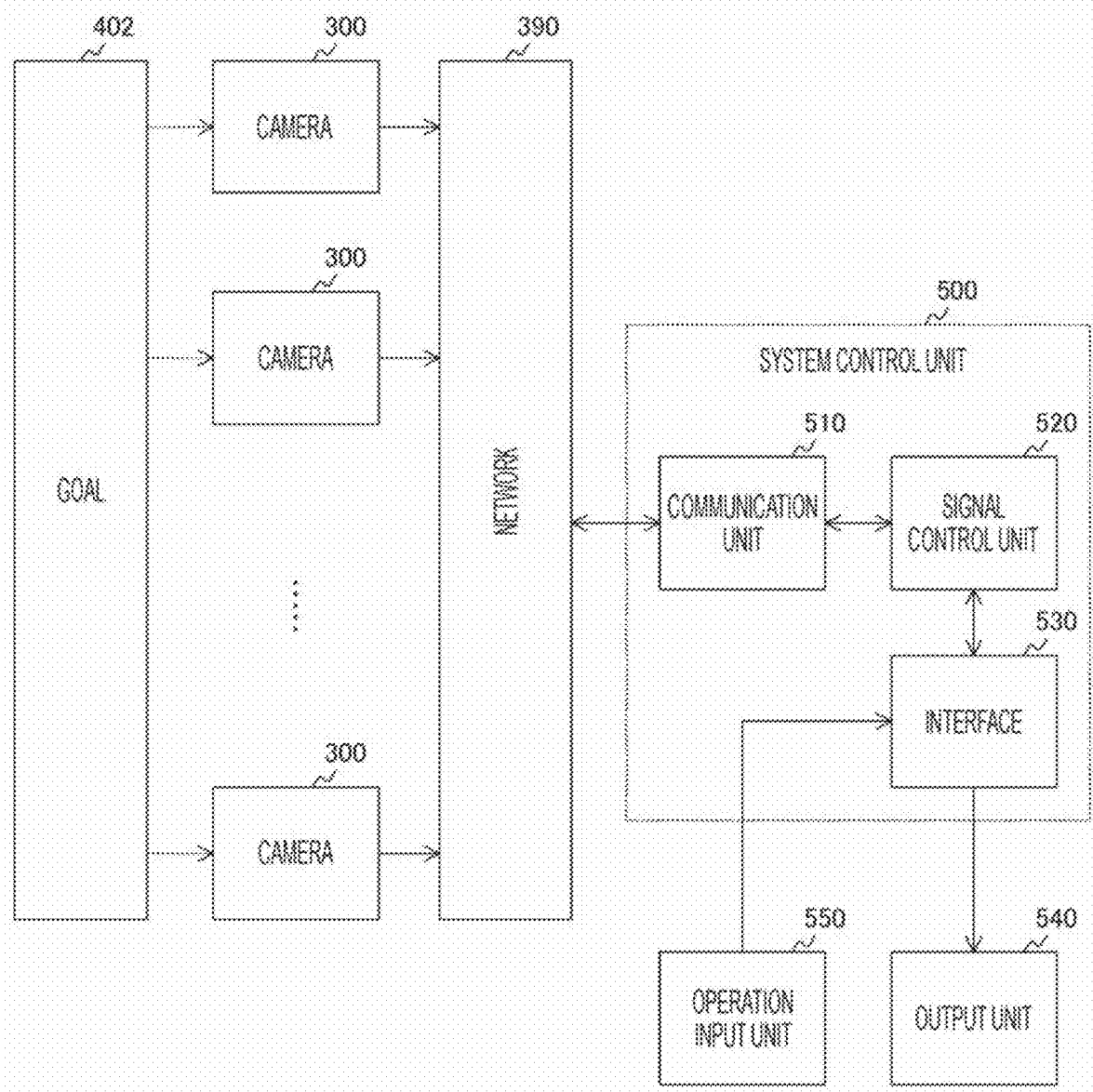
FIG. 8 is a diagram illustrating an example of an overall configuration of a soccer goal detection system according to a second embodiment of the present technology.

FIG. 8 is a diagram illustrating an example of an overall configuration of a soccer goal detection system according to the second embodiment of the present technology. As with the first embodiment described above, this soccer goal detection system is provided with the plurality of cameras 300, the network 390, the system control unit 500, the output unit 540, and the operation input unit 550.

In this soccer goal detection system, the plurality of cameras 300 are provided at a plurality of positions around a goal 402 of soccer. Each of the plurality of cameras 300 captures an image of a spherical soccer ball as a target object, the soccer ball being a moving object, and performs detection processing to output detection information. In this second embodiment, a passing state of a soccer ball is detected. In addition, the system control unit 500 determines whether or not the soccer ball has passed through the goal 402.

In this second embodiment, the operation input unit 550 is used to give an instruction of the start and end of the game by a referee of a soccer game. In addition, in this second embodiment, the output unit 540 is used to output information indicating whether or not the soccer ball has passed through the goal 402, and an image at that point of time. For example, a watch-type wearable monitor or the like can be employed as this output unit 540. The referee is able to make an exact goal determination by using this output unit 540 during a game.

The other configurations are similar to those in the first embodiment described above, and therefore detailed description thereof will be omitted.

Figure 9:
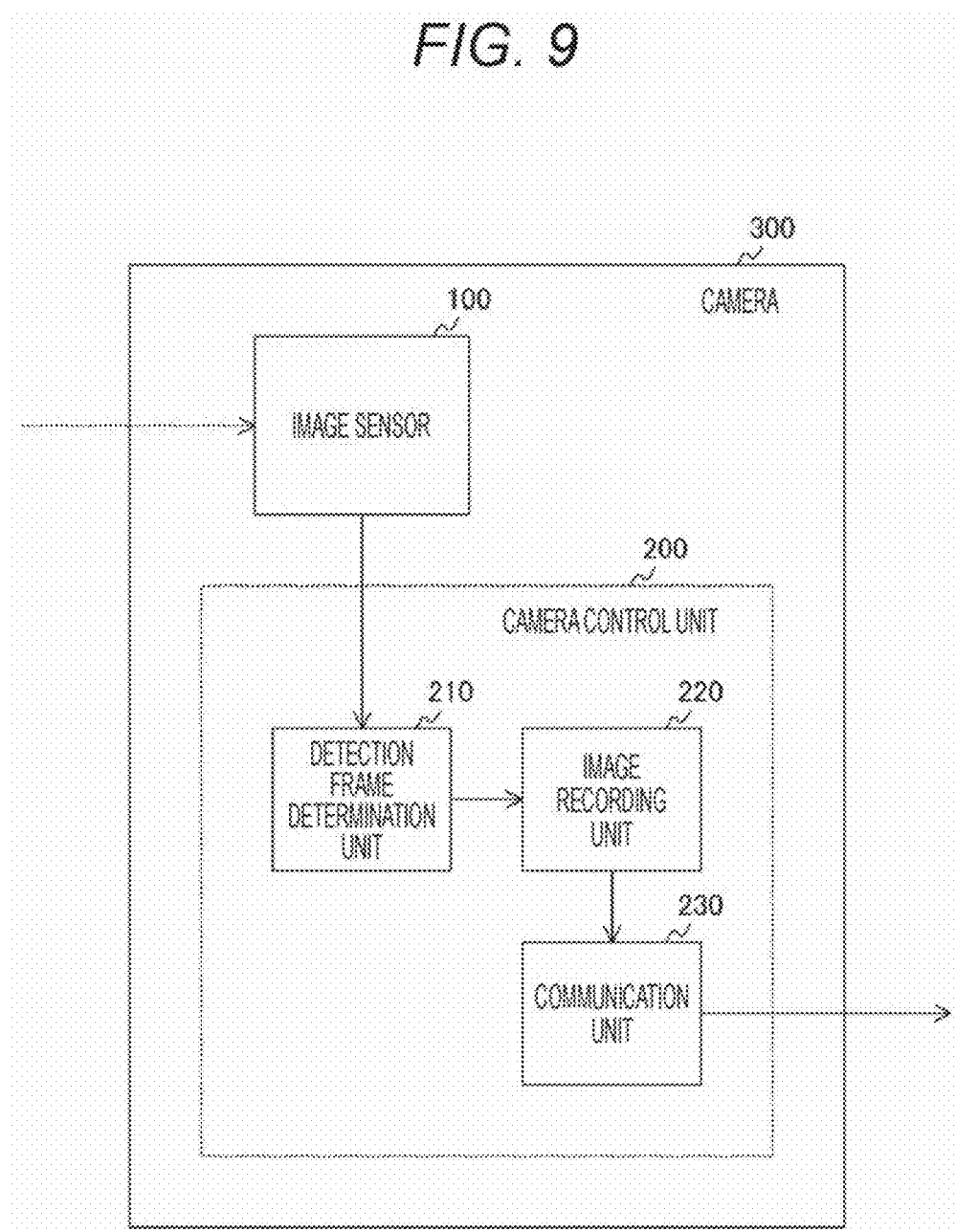
FIG. 9 is a diagram illustrating a configuration example of the camera 300 according to the second embodiment of the present technology.

FIG. 9 is a diagram illustrating a configuration example of the camera 300 according to the second embodiment of the present technology. As with the first embodiment described above, this camera 300 according to the second embodiment is provided with the image sensor 100 and the camera control unit 200.

The camera control unit 200 of the camera 300 according to the second embodiment is provided with the detection frame determination unit 210, the image recording unit 220, and the communication unit 230. In this second embodiment, the detection frame determination unit 210 determines relationship between a soccer ball and a detection frame.

The other configurations related to the image sensor 100 and the camera control unit 200 are similar to those in the first embodiment described above, and therefore detailed description thereof will be omitted.

Figure 10:
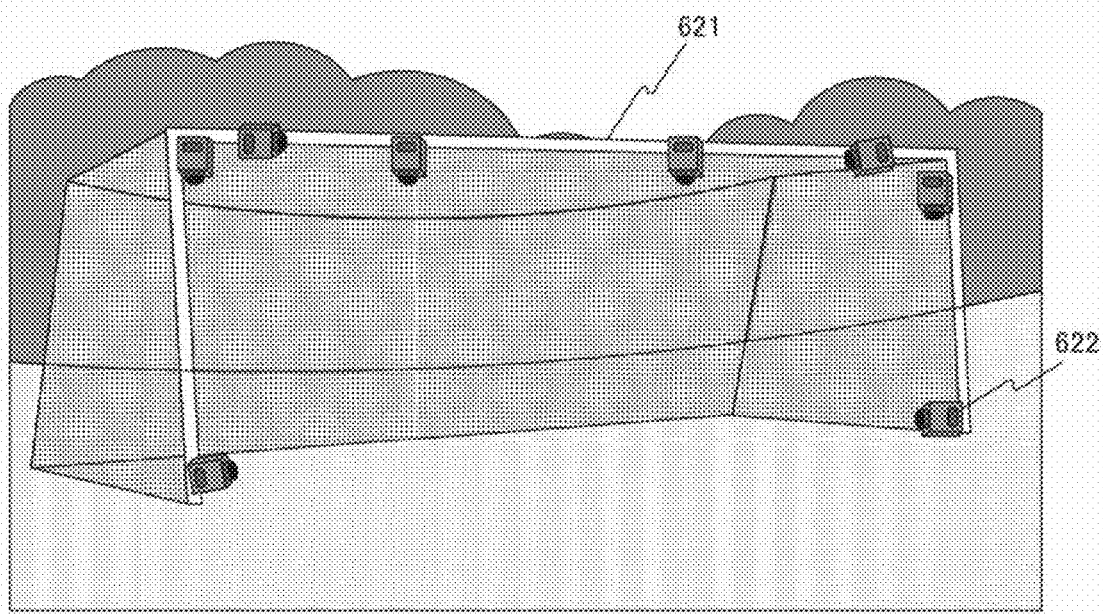
FIG. 10 is a view illustrating an installation example of the camera 300 according to the second embodiment of the present technology.

FIG. 10 is a view illustrating an installation example of the cameras 300 according to the second embodiment of the present technology. In this embodiment, cameras 622 are installed at a plurality of positions of a goal 621 of soccer. The cameras 622 correspond to the above-described cameras 300. Since players irregularly move during a game, there is a case where a goal determination becomes unclear by being concealed by a soccer ball. In this embodiment, a correct determination can be made by installing the cameras 622 at the plurality of positions of the goal 621 of soccer to capture images from many directions.

In addition, in a case where a goal determination by visual observation is not clear, a correct determination can be made by checking an image recorded in the image recording unit 220. This image is captured within a short time during which the soccer ball has passed, which enables the referee to easily check the image.

Figure 11A:
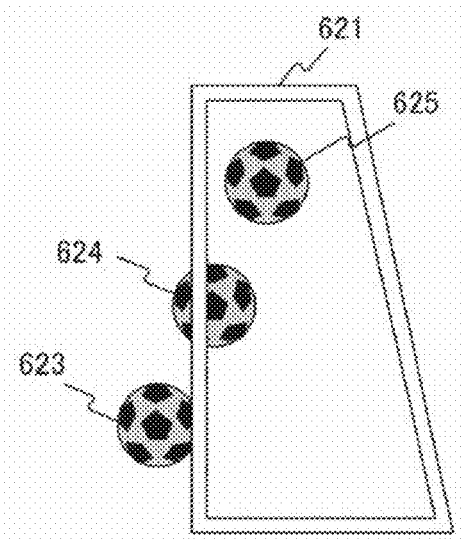
FIGS. 11A and 11B are views illustrating an example of relationship between a goal 621 and the detection frame in the second embodiment of the present technology.
Figure 11B:
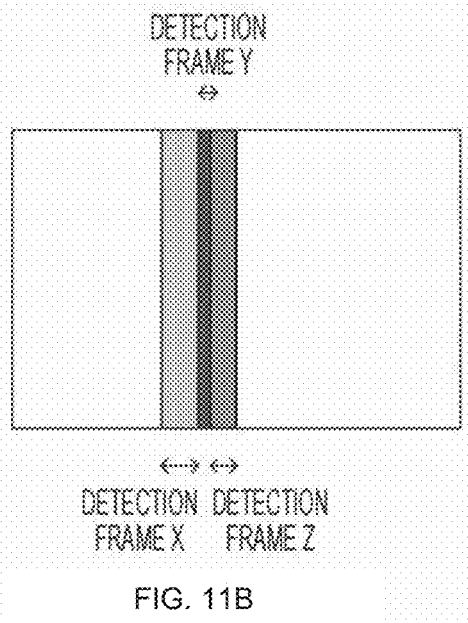

FIGS. 11A and 11B are views illustrating an example of relationship between the goal 621 and the detection frame in the second embodiment of the present technology.

As shown in a of the same figure, with respect to soccer, in a case where the whole ball completely enters the goal 621 as indicated by a soccer ball 625, a goal is scored. Therefore, as indicated by soccer balls 623 and 624, a goal is not scored in a state in which the whole ball does not enter the goal.

As shown in b of the same figure, detection frames are provided so as to determine whether or not a goal has been scored. A detection frame X is used to detect the ball in an area before the goal 621. The detection frame determination unit 210 uses this detection frame X to detect that the ball has approached the goal 621. Consequently, the image recording unit 220 starts recording of a frame image.

A detection frame Y is used to detect the ball above a line of the goal 621. The detection frame determination unit 210 uses this detection frame Y to detect that the ball is above the line of the goal 621. Consequently, the detection frame determination unit 210 starts determination as to whether or not a goal has been scored.

A detection frame Z is used to detect the ball in the goal 621. The detection frame determination unit 210 uses this detection frame Z to detect that the ball is inside the goal 621. Consequently, the detection frame determination unit 210 recognizes the ball in the detection frame Z, and in a case where no ball exists in the detection frame Y, the detection frame determination unit 210 determines that a goal has been scored.

Subsequently, the detection frame determination unit 210 determines that a ball is not detected in any of the detection frames X, Y, and Z. Consequently, the image recording unit 220 ends recording of the frame image.

Operation of Soccer Goal Detection System

Figure 12:
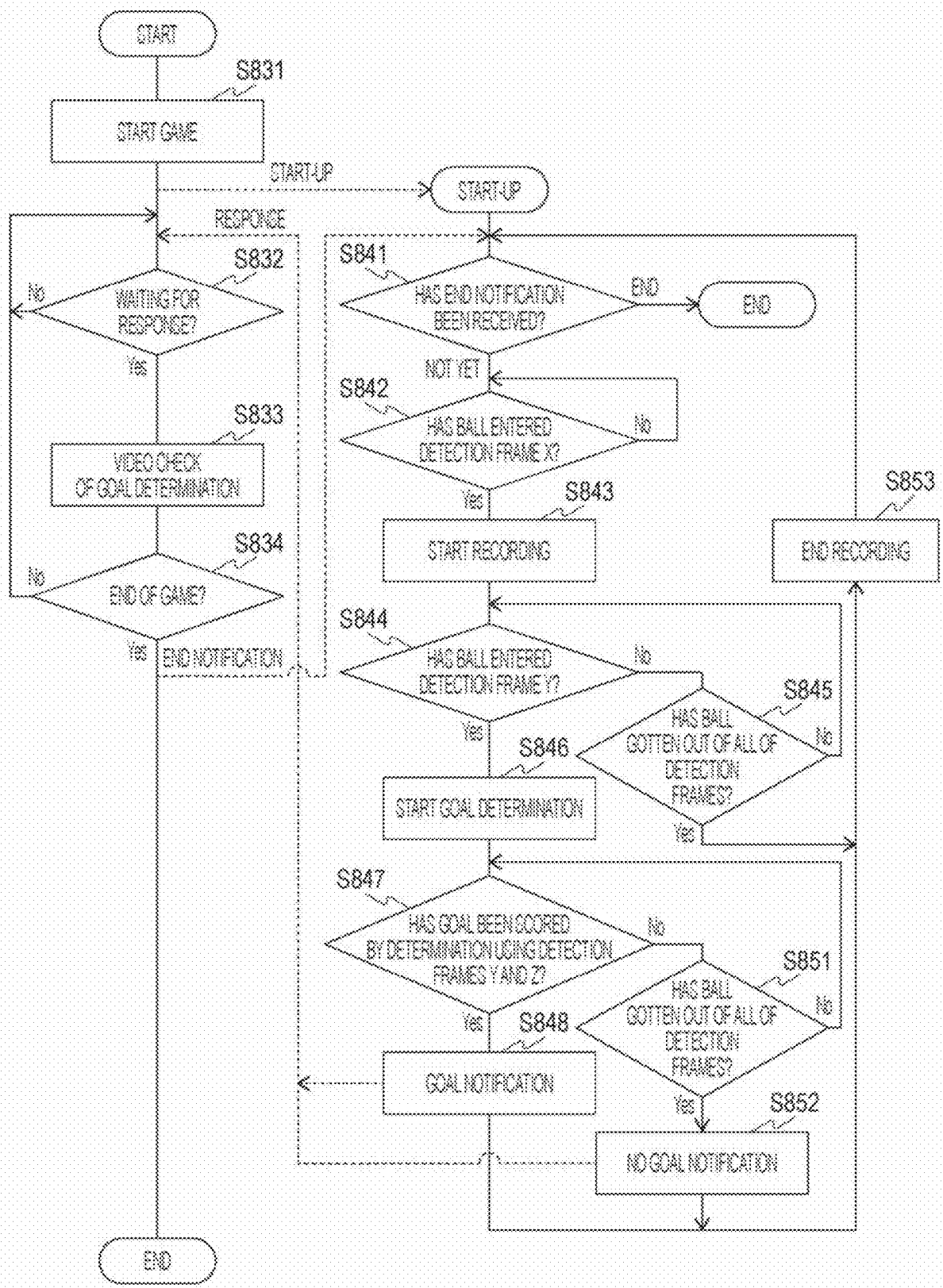
FIG. 12 is a flowchart illustrating an example of a processing procedure of the soccer goal detection system according to the second embodiment of the present technology.

FIG. 12 is a flowchart illustrating an example of a processing procedure of the soccer goal detection system according to the second embodiment of the present technology. The left side indicates a processing procedure of the system control unit 500, and the right side indicates a processing procedure of the camera 300.

When a start of a soccer game is given in instruction in the operation input unit 550 (step S831), operation is started in the plurality of cameras 300. Subsequently, the system control unit 500 enters a response waiting state of waiting for a response from the camera 300 (step S832). Once the camera 300 is started up, the camera 300 repeats the following processing until an end notification is received from the system control unit 500 (step S841).

The detection frame determination unit 210 repeats determination until a ball enters the detection frame X in a frame image (step S842: No). When the ball enters the detection frame X (step S842: Yes), the image recording unit 220 starts recording of the frame image (step S843). In addition, the detection frame determination unit 210 repeats the detection until the ball enters the detection frame Y in the frame image (step S844: No, S845: No), and when the ball enters the detection frame Y (step S844: Yes), a goal determination is started (step S846). Meanwhile, in a case where the ball gets out of all of the detection frames (step S845: Yes), the image recording unit 220 ends recording of the frame image (step S853), and the camera 300 enters a waiting state of waiting for an end notification from the system control unit 500 (step S841).

After a goal determination is started, the detection frame determination unit 210 recognizes a ball in the detection frame Z, and in addition thereto, in a case where the ball does not exist in the detection frame Y, the detection frame determination unit 210 determines that a goal has been scored (step S847: Yes), and notifies the system control unit 500 that the goal has been scored (step S848). The detection frame determination unit 210 repeats the determination of the step S847 until the ball gets out of all of the detection frames (step S851: No). In addition, in a case where the ball gets out of all of the detection frames (step S851: Yes), the detection frame determination unit 210 determines that a goal has been scored, and notifies the system control unit 500 that the goal has not been scored (step S852). Subsequently, the image recording unit 220 ends recording of the frame image (step S853), and the camera 300 enters a waiting state of waiting for an end notification from the system control unit 500 (step S841).

When the system control unit 500 receives, as a response from the camera 300, a notification that a goal has been scored or a notification that a goal has not been scored (step S832: Yes), the system control unit 500 makes a goal determination (step S833). In that case, an image recorded in the image recording unit 220 may be checked as necessary to perform video determination. The system control unit 500 repeats the series of processing until the game ends (step S834: No). When the game ends (step S834: Yes), the system control unit 500 notifies the camera 300 of the end, and causes the process to end. When the camera 300 receives the end notification from the system control unit 500 (step S841: end), the camera 300 ends the process.

Incidentally, in a case where notifications have been received from the plurality of cameras 300, it is assumed that the system control unit 500 performs processing in step S833 and later for the earliest detection.

In this manner, according to the second embodiment of the present technology, by determining a detection frame at a high frame rate of 1000 fps or more in the plurality of cameras 300 provided in the soccer goal, it can be detected with high accuracy that a goal has been scored.

It should be noted that the above embodiment is described as an example for realizing the present technology, and the matters in the embodiment and the invention defining matters in claims respectively have correspondence relationships therebetween. Similarly, the invention defining matters in claims, and the matters in the embodiment of the present technology, which have the same names as those of the invention defining matters in claims respectively, have respective correspondence relationships therebetween. However, the present technology is not limited to the embodiment, and the present technology can be realized by making various kinds of modifications to the embodiment within the scope that does not deviate from the gist thereof.

In addition, the processing procedures described in the above-described embodiments may be considered as a method including the series of steps, or as a program that causes a computer to execute the series of steps, or as a recording medium for storing the program. As this recording medium, for example, a Compact Disc (CD), a MiniDisc (MD), a Digital Versatile Disc (DVD), a memory card, a Blu-ray Disc (Blu-ray (registered trademark) Disc), or the like can be used.

It should be noted that the effects described in the present description are to be construed as merely illustrative, and are not limitative, and that, in addition, other effects may be produced.

It should be noted that the present technology can also employ the following configurations.

(1) A detection system including:
a plurality of cameras, each of which performs detection processing to output detection information;
a network that transmits pieces of detection information from the plurality of cameras; and
a system control unit that determines occurrence of a predetermined event on the basis of the pieces of detection information from the plurality of cameras, in which
each of the plurality of cameras includes:
an image capturing element that captures an image of a target object, and generates image-data frames that time-sequentially line up;
a binarization processing unit that subjects each of the frames to binarization processing to generate binarized frames;
a moment generation unit that calculates a moment of the target object included in the binarized frames;
a target object detection unit that detects the target object included in the binarized frames on the basis of the moment generated by the moment generation unit; and
a detection frame determination unit that determines relationship between the target object and a predetermined detection frame, and generates a result of the determination as the detection information.

(2) The detection system set forth in the preceding (1), in which
the system control unit determines occurrence of the predetermined event on the basis of detection information detected earliest among the pieces of detection information from the plurality of cameras.

(3) The detection system set forth in the preceding (1) or (2), in which
each of the plurality of cameras further includes an image recording unit that records the frames generated by the image capturing element according to the detection information generated by the detection frame determination unit.

(4) The detection system set forth in any of the preceding (1) to (3), in which:
the plurality of cameras are provided corresponding to a plurality of vehicle doors respectively; and
the detection system further includes a door control determination unit that gives an instruction of control for the corresponding vehicle door according to the detection information generated by the detection frame determination unit.

(5) The detection system set forth in any of the preceding (1) to (3), in which:
each of the plurality of cameras is provided around a goal of a ball game;
the target object detection unit detects a spherical body as the target object; and
the detection frame determination unit determines whether or not the whole spherical body has entered the goal.

REFERENCE SIGNS LIST

100 Image sensor
110 Image capturing unit
120 Filter processing unit
130 Binarization processing unit
150 Moment generation unit
170 Target object detection unit
190 Interface
200 Camera control unit
210 Detection frame determination unit
220 Image recording unit
230 Communication unit
240 Instruction unit
250 Door control determination unit
300 Camera
390 Network
401 Vehicle door
402 Goal
410 Door control unit
500 System control unit
510 Communication unit
520 Signal control unit
530 Interface
540 Output unit
550 Operation input unit
611 Vehicle
612 Camera
613 Vehicle door
614 Roller
615 Coil
616 Permanent magnet
621 Goal
622 Camera

The invention claimed is:
1. A detection system, comprising:
a plurality of cameras, wherein each camera of the plurality of cameras includes first circuitry configured to:
obtain an image of a target object;
generate a plurality of image-data frames that time-sequentially line up, wherein the plurality of image-data frames is generated based on the image of the target object;
execute a binarization process on each image-data frame of the plurality of image-data frames to generate a plurality of binarized frames;
calculate a moment of the target object in the plurality of binarized frames;
detect the target object in the plurality of binarized frames based on the calculated moment;
determine a first relationship between the target object and a first detection frame in a first image-data frame of the plurality of image-data frames, wherein the first relationship indicates the target object has entered the first detection frame;
determine, based on the first relationship, a second relationship between the target object and a second detection frame in a second image-data frame of the plurality of image-data frames, wherein the second relationship indicates the target object has entered the second detection frame;
generate a first piece of detection information based on the second relationship; and
output the first piece of detection information;
second circuitry; and
a network configured to:
receive a plurality of pieces of detection information from the plurality of cameras, wherein
each piece of detection information of the plurality of pieces of detection information corresponds to a respective camera of the plurality of cameras, and
the plurality of pieces of detection information includes the first piece of detection information; and
output the plurality of pieces of detection information to the second circuitry, wherein the second circuitry is configured to:
detect the plurality of pieces of detection information output from the network; and
determine occurrence of a specific event based on a second piece of detection information of the plurality of pieces of detection information, wherein the second piece of detection information is detected earliest among the plurality of pieces of detection information.

2. The detection system according to claim 1, wherein the first circuitry of each camera of the plurality of cameras is further configured to control record of the generated plurality of image-data frames based on the first piece of detection information.

3. The detection system according to claim 1, wherein:
each camera of the plurality of cameras corresponds to a respective vehicle door of a plurality of vehicle doors of a vehicle, and
the first circuitry is further configured to transmit an instruction to control the respective vehicle door based on the generated first piece of detection information.

4. The detection system according to claim 1, wherein each camera of the plurality of cameras is around a goal of a ball game, and
the first circuitry is further configured to:
detect a spherical body as the target object; and
determine entry of the spherical body into the goal based on the detection of the spherical body as the target object.

5. The detection system according to claim 1, wherein the first circuitry is further configured to transmit an interrupt signal to a vehicle door of a vehicle to stop a closing operation of the vehicle door, and
the interrupt signal is transmitted based on the generated first piece of detection information.

6. The detection system according to claim 3, wherein the first circuitry of each camera of the plurality of cameras is further configured to transmit specific information that indicates a number of the respective vehicle door.

* * * * *